United States Patent
Todeschini et al.

(10) Patent No.: US 9,557,805 B2
(45) Date of Patent: Jan. 31, 2017

(54) POWER MANAGEMENT CIRCUIT FOR A SELF-POWERED SENSOR

(71) Applicant: STMicroelectronics SA, Montrouge (FR)

(72) Inventors: Fabien Todeschini, Crolles (FR); Christophe Planat, Bernin (FR); Patrizia Milazzo, Agata Li Battiati (IT); Salvatore Tricomi, Gregorio di Catania (IT); Séverin Trochut, Gilly sur Isere (FR); Pascal Urard, Theys (FR)

(73) Assignee: STMICROELECTRONICS SA, Montrouge (FR)

( * ) Notice: Subject to any disclaimer, the term of this patent is extended or adjusted under 35 U.S.C. 154(b) by 147 days.

(21) Appl. No.: 14/279,514

(22) Filed: May 16, 2014

(65) Prior Publication Data
US 2014/0359332 A1 Dec. 4, 2014

(30) Foreign Application Priority Data
May 31, 2013 (FR) ...................................... 13 55007

(51) Int. Cl.
*G06F 1/32* (2006.01)
*H02J 7/35* (2006.01)

(52) U.S. Cl.
CPC ............... *G06F 1/3293* (2013.01); *H02J 7/35* (2013.01)

(58) Field of Classification Search
CPC ............ G06F 1/3293; H02J 7/35; H02J 3/383; Y02E 70/30; Y02E 10/50
See application file for complete search history.

(56) References Cited

U.S. PATENT DOCUMENTS

| 4,401,935 | A | 8/1983 | Yerkes | |
|---|---|---|---|---|
| 5,001,415 | A * | 3/1991 | Watkinson | G05F 1/67 136/293 |
| 7,808,213 | B2 * | 10/2010 | Tsai | H01G 9/048 320/101 |
| 2001/0043050 | A1 * | 11/2001 | Fisher, Jr. | H02J 7/0068 320/101 |
| 2004/0232878 | A1 * | 11/2004 | Couch | H02J 1/14 320/101 |
| 2006/0185727 | A1 * | 8/2006 | Matan | H01L 31/02021 136/244 |
| 2010/0016034 | A1 * | 1/2010 | Lindqvist | H02J 7/34 455/573 |
| 2011/0273130 | A1 * | 11/2011 | Lee | H01M 10/465 320/101 |
| 2012/0235491 | A1 * | 9/2012 | Nakashima | H02J 7/35 307/66 |

(Continued)

FOREIGN PATENT DOCUMENTS

| JP | 2011244549 A | 12/2011 |
|---|---|---|
| JP | 20120139009 A | 7/2012 |
| WO | 2012153477 A1 | 11/2012 |

*Primary Examiner* — Kim Huynh
*Assistant Examiner* — Kevin Stewart
(74) *Attorney, Agent, or Firm* — Allen, Dyer, Dopplet, Milbrath & Gilchrist, P.A. Attorneys at Law

(57) ABSTRACT

A power management circuit including, between a first terminal intended to be connected to an electric power generation source and a second terminal intended to be connected to a load to be powered, a linear regulator and a circuit capable of activating the linear regulator when the power supplied by said source is greater than a first threshold.

19 Claims, 3 Drawing Sheets

(56) References Cited

U.S. PATENT DOCUMENTS

2012/0256581 A1     10/2012  Lee et al.
2013/0181655 A1*    7/2013   Yokoyama ................ H02J 7/35
                                                        320/101
2014/0176043 A1     6/2014   Fujiyama

* cited by examiner

POWER MANAGEMENT CIRCUIT FOR A SELF-POWERED SENSOR

CROSS REFERENCE TO RELATED APPLICATION

This application claims the priority benefit of French Patent application number 13/55007, filed on May 31, 2013, entitled "Circuit de gestion d'énergie d'un capteur autonome", the contents of which is hereby incorporated by reference in its entirety to the maximum extent allowable by law.

BACKGROUND

The present disclosure generally relates to electronic circuit, and more specifically to power management in low-power devices which need to have a self-powered operation.

DISCUSSION OF THE RELATED ART

Power management systems aim at optimizing the energetic efficiency of a device. When the device comprises a battery and is also associated with a local power generation system (for example, of photovoltaic panel type), such a power generation system is used to recharge the battery, which itself powers the device.

SUMMARY

An embodiment provides a power management circuit which overcomes all or part of the disadvantages of usual circuits.

Another embodiment provides a circuit particularly adapted to a low-power self-powered device.

Another embodiment provides a circuit particularly adapted to being powered by means of photovoltaic panels.

Another embodiment provides a circuit enabling to directly power a load while recharging/discharging a battery.

A power management circuit comprises, between a first terminal intended to be connected to an electric power generation source and a second terminal intended to be connected to a load to be powered, a linear regulator and a circuit capable of activating the linear regulator when the power supplied by said source is greater than a first threshold.

According to an embodiment, the circuit further comprises a third terminal intended to be connected to a rechargeable battery.

According to an embodiment, the circuit comprises:
a first operating mode where the regulator is disconnected, the load being exclusively powered by the battery;
a second operating mode where the regulator is in a conductive state, with no regulation, the voltage of the second terminal being set by the battery; and
a third mode where the regulator regulates and sets the voltage of the second terminal, the load being powered by the electric power generation source.

According to an embodiment, the battery is recharged in the third operating mode.

According to an embodiment, the circuit comprises an element for detecting the voltage level received on the first terminal.

According to an embodiment, the circuit comprises a detector of the charge level of the battery.

According to an embodiment, the present invention provides a self-powered device comprising:
a power generation source;
a rechargeable battery; and
the power generation circuit mentioned hereabove.

According to an embodiment, the power generation source is a photovoltaic panel.

The foregoing and other features and benefits will be discussed in detail in the following non-limiting description of specific embodiments in connection with the accompanying drawings.

DETAILED DESCRIPTION

Figure 1:
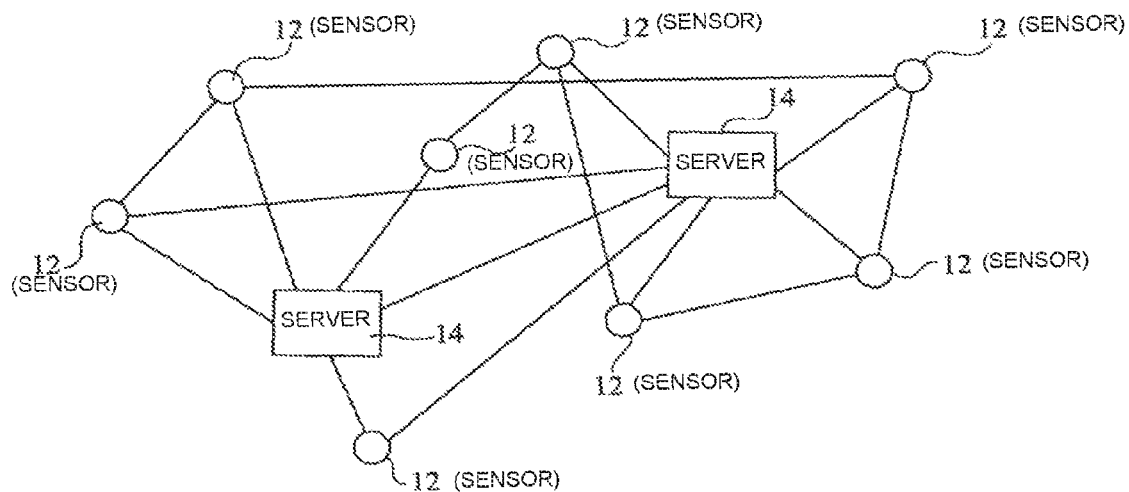
FIG. 1 is a very simplified representation of a self-powered sensor system of the type to which the embodiments which will be described apply as an example.

The same elements have been designated with the same reference numerals in the different drawings. For clarity, only those elements which are useful to the understanding of the embodiments which will be described have been detailed. In particular, the nature of the circuit powered by the power management circuit has not been shown and will not be detailed, the described embodiments being compatible with loads generally forming self-powered devices. Further, the structure of the power generation devices, and in particular of photovoltaic panel type, has not been detailed either, the described embodiments being here again compatible with usual power generation devices.

FIG. 1 is a very simplified representation of a network of self-powered sensors of the type to which the embodiments which will be described apply as an example.

Such a network comprises many sensors 12 of identical or different nature, which are capable of communicating together and/or with servers 14 (in practice, computer-type tools). Sensors 12 are called self-powered in that they require no intervention to change power supply batteries and that they require no connection to the electric distribution system. In practice, such self-powered sensors are equipped with one or several rechargeable batteries capable of being recharged by a local power source such as a photovoltaic panel, a wind energy unit, etc.

Although reference has been made hereabove to self-powered sensors, the present description more generally applies to any low-power electronic device (from a few microwatts to a few milliwatts).

Figure 2:
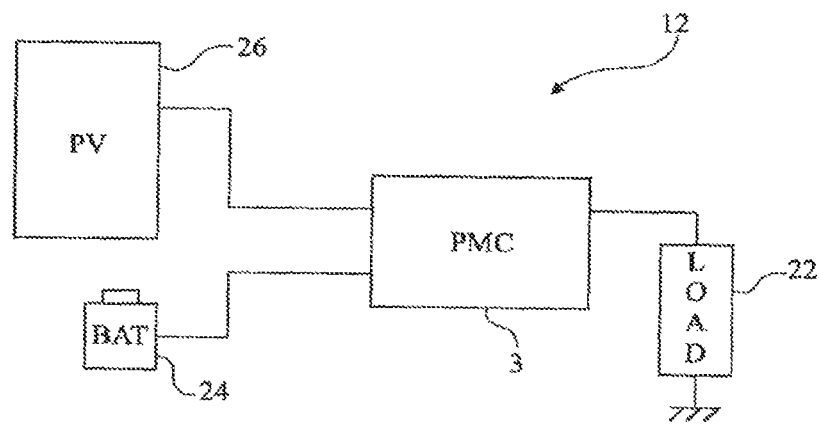
FIG. 2 shows, in the form of blocks, an example of self-powered device associated with a battery and with a photovoltaic panel.

FIG. 2 is a simplified representation of a self-powered device 12 (for example, one of the sensors of FIG. 1). Device 12 comprises measurement and/or processing, communication, etc. circuits, which form load 22 (LOAD) which need being powered in order to operate.

Circuits 22 are capable of being powered either from a rechargeable battery 24 (BAT), or from, in this example, one or several photovoltaic panels 26 (PV). The battery and the photovoltaic panels provide the power to a power management circuit 3 (PMC) having the function of organizing the power supply to load 22 and the recharging of battery 24 by means of photovoltaic panels 26. Circuit 3 also has the function of regulating the voltage intended for load 22 having circuits which generally cannot withstand the voltage variations of power sources.

In most cases, when a power generation system of photovoltaic panel type is used to power a low-power circuit, such a panel is used to recharge the battery, which itself powers the system. In other cases where a non-rechargeable battery is provided, said battery is used as a backup power supply and the most part of the power is provided by the local production system.

It would be desirable to improve the power management of such locally-powered circuits to decrease their consumption and enable them to operate in most situations.

Thus, a power management circuit 3 is provided, which enables to use, in order to power load 22, either power generation device 26, or battery 24, or both, while enabling to recharge the battery by means of device 26, this while consuming little power, and without requiring any power conversion.

It could have been devised to associate, with each element 24, 26, a voltage regulator having its outputs processed by a switching and selection mechanism towards the load. This would however result in a particularly complex and power-intensive circuit.

Thus, the different solutions which might be possible in high-power applications (of laptop computer type, for example) are not adapted to the applications targeted by the present disclosure.

Figure 3:
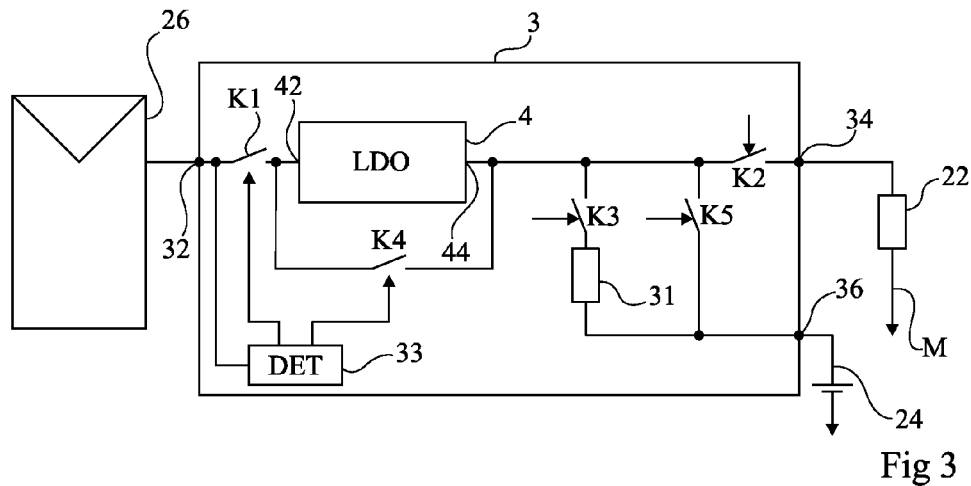
FIG. 3 very schematically and functionally shows an embodiment of a power management circuit.

FIG. 3 very schematically shows an embodiment of a power management circuit 3. As illustrated in relation with FIG. 2, circuit 3 is connected to a panel or to an assembly of photovoltaic cells 26, to a rechargeable battery 24, and to load 22 to be powered.

The representation of FIG. 3 is functional to describe the system operation. Embodiments will be illustrated in relation with FIGS. 4 and 5.

Circuit 3 is based on the use of a low drop-out (LDO) regulator 4. An input terminal 42 of regulator 4 is (functionally) connected, via a switch K1, to an input terminal 32 of circuit 3 intended to receive the voltage provided by photovoltaic panel 26. In practice, terminal 32 receives the positive potential provided by the panel. Circuit 3 is of course fitted with ground connections, which have not been shown. An output terminal 44 of regulator 4 is connected, via a switch K2, to an output terminal 34 of circuit 3 intended to be connected to load 22. Here again, terminal 44 designates the terminal for providing a positive voltage and load 22 is further connected to ground M.

A terminal 36 of circuit 3, intended to be connected to the positive electrode of battery 24 is connected, via a switch K3, to terminal 44, the other electrode of the battery being grounded. In practice, an element 31 for limiting the current in the branch of switch K3 is inserted, for example, between switch K3 and terminal 36.

Regulator 4 may be shorted (disconnected) by means of a switch K4 connecting its input and output terminals 42 and 44. Further, a switch K5 directly connects terminal 44 to terminal 36 and thus short-circuits the branch formed of switch K3 and of element 31.

Switches K1 and K4 are controlled, in reverse fashion with respect to each other, by a detector 33 (DET) of the power provided by panel 26. In the example of FIG. 3, detector 33 analyzes the voltage present on terminal 32 to determine whether or not the panel delivers power. Switch K2 is controlled according to the charge level in the battery.

Switches K3 and K5 are controlled according to the lighting level (power supply by panel 26) in reverse fashion with respect to each other. Switch K5 is further also controlled according to the value of the voltage at terminal 34.

The inventors provide taking advantage of a specificity of photovoltaic panels, which is that the voltage that they supply is determined by the load to which they are connected, the converted amount of power translating as more or less supplied current.

Circuit 3 is provided for three operating modes, which result in three configurations of switches K1 to K5.

Figure 3A:
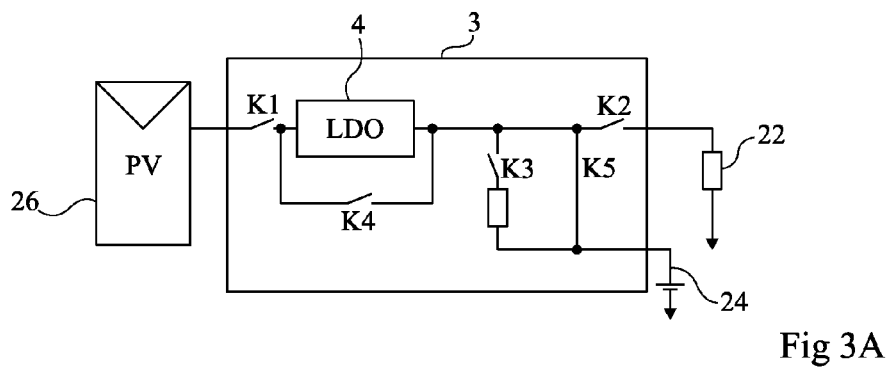
FIGS. 3A, 3B, and 3C show different configurations of the circuit of FIG. 3.
Figure 3B:
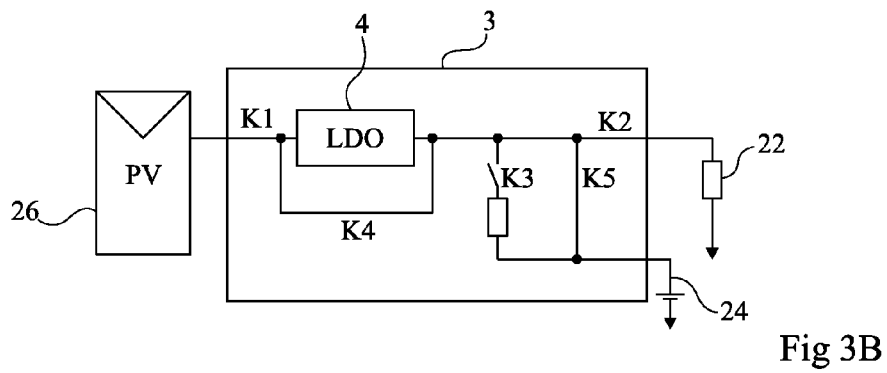
Figure 3C:
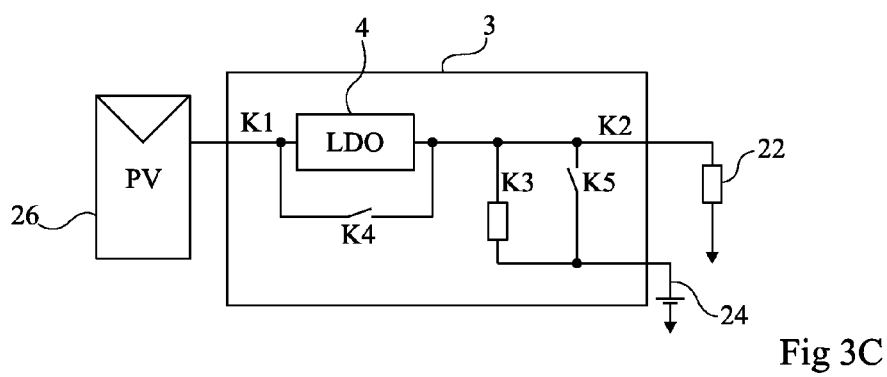

FIGS. 3A, 3B, and 3C illustrate the three operating modes of circuit 3.

Figure 4:
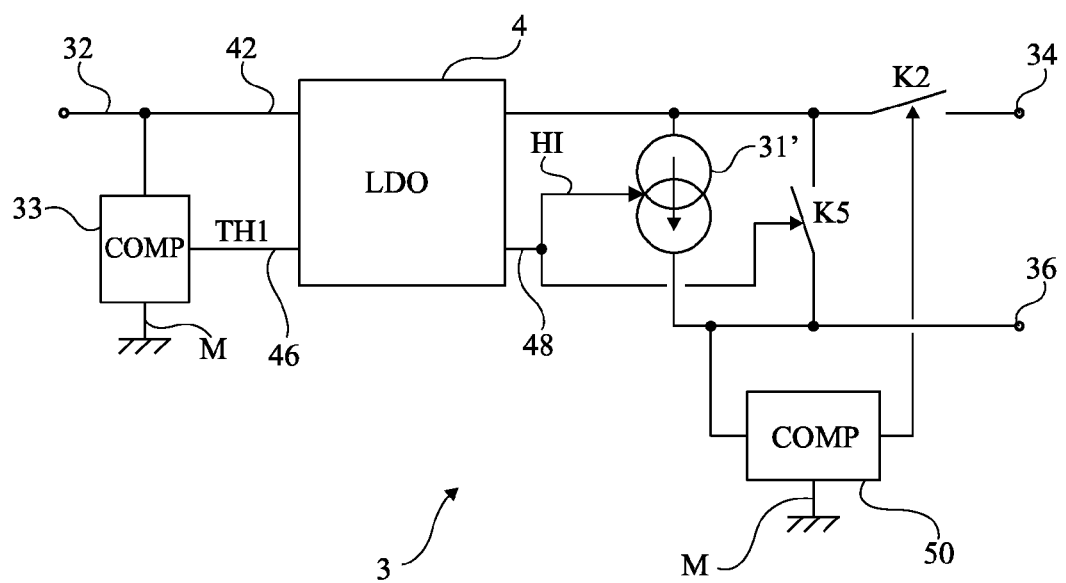
FIG. 4 is a more detailed diagram of the circuit of FIG. 3.

FIG. 3A illustrates an operating mode where no power, or a power lower than a first threshold, is provided by photovoltaic panel 26. Typically, this corresponds to a night-time operation. In such a configuration, switches K1 and K4 are off so that photovoltaic panel 26 is disconnected from downstream of the system. Switch K3 is also off since the battery cannot be charged. Switch K5 is on, to enable the battery to power the load, according to the state of switch K2. Switch K2, as will be illustrated in relation with FIG. 4, is on if the power level in battery 24 is sufficient to power the load and is off if this level is lower than a threshold. All the electronic blocks of the circuit are deactivated, except the battery voltage level comparator for controlling switch K2 and powering, if possible, load 22.

FIG. 3B illustrates an operating mode, of so-called low power generation by panel 26, which for example corresponds to a low lighting. In this case, switches K1 and K4 are on so that photovoltaic panel 26 directly powers the system without passing through the voltage regulator. This case corresponds to a situation where the provided power level is lower than the maximum value of the battery charge current. Switch K3 is thus off. Switch K5 is on, which enables to set the voltage of photovoltaic panel 26 to the voltage across battery 24 and thus to protects load 22. As previously, switch K2 is off or on according to the battery charge level. If this switch is off, the photovoltaic panel directly recharges the battery via switch K5. If the current provided by panel 26 is lower than the current requested by load 22, the battery provides the rest via switch K5. If the current supplied by the panel is greater than the load request, the rest is used to recharge the battery via switch K5, except if the battery is already fully charged, in which case the regulator is active to protect load 22 and to limit the battery voltage.

FIG. 3C illustrates another operating mode, called full lighting mode, where the power supplied by photovoltaic panel 26 becomes sufficient to limit the battery charge. Regulator 4 should here be used to limit the voltage both at the level of load 22 and at the battery level to avoid exceeding its maximum charge voltage. Accordingly, switch K4 is off, switch K1 being on. On the battery side, switch K5 is off and switch K3 is on. In such a configuration, photovoltaic panel 26 both recharges the battery and powers load 22 (switch K2 being on). If load 22 requests a current greater than that provided by panel 26, switch K5 rapidly turns on so that the battery provides the additional power.

A function of switch K2 is to protect the battery to avoid for it to discharge below its critical threshold. Any battery indeed has a threshold below which it should not be discharged, short of which it risks being irremediably damaged. It can be considered that switch K2 provides a switching to a safety mode when turned off. When the battery charge becomes sufficient again, switch K2 is turned back on.

A function of detector 33 is to delay the activation of linear regulator 4 until a voltage threshold considered as sufficient is reached. The power management is thus optimized by avoiding the voltage drop through the regulator and losses generated therein when the power supplied by the photovoltaic panel is minimum.

FIG. 4 shows a more detailed diagram of an embodiment of a circuit 3.

Regulator 4 (LDO) symbolized in FIG. 4 is a linear regulator capable of having three operating modes: a disconnected mode where it does not consume power, a follower-type mode where it is functionally shorted (situation of FIG. 3B), that is, it introduces a minimum voltage drop, and a regulation mode (situation of FIG. 3C) where it regulates the voltage that it receives as an input.

The power generation (indirectly, the light intensity) is, in the example of FIG. 4, measured from a comparator 33 (COMP) having its input connected to terminal 32 and having its output connected to an input terminal of regulator 4. Comparator 33 defines a first threshold TH1, as will be seen hereafter. Current limiting element 31 and switch K3 are, for example, formed of a controllable current source referred to as 31', capable of being activated by a signal HI provided by regulator 4, on a terminal 48. Signal HI is in the active state (second threshold) when a sufficient current is detected in the regulator. Switch K5 is also controlled from signal HI to be turned on when current source 31' is deactivated.

The battery charge level is measured by means of a comparator 50 (COMP) having a first input connected to terminal 36 and having a second input connected to ground, the output of comparator 50 enabling to activate or to deactivate switch K2.

An advantage of the embodiments which have been described is that the power consumption of the power management system is minimum. In particular, the fact of shorting the regulator considerably decreases the consumption in low-power applications.

Another advantage is that the power management circuit is self-powered, in that it requires no control signals originating either from the load, or from the photovoltaic panel. It only measures the voltage levels on the photovoltaic side and on the battery side with respect to thresholds.

Another advantage is that the regulator structure is particularly simple.

Another advantage is that the power management circuit enables to directly power the load and to recharge the battery with the photovoltaic panel without requiring a power conversion, the concerned voltages being identical or of the same order of magnitude.

Various embodiments have been described. Various alterations, modifications, and improvements will readily occur to those skilled in the art. In particular, the practical implementation of the described embodiments is within the abilities of those skilled in the art based on the functional indications given hereabove and by using components usual per se.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A power management circuit comprising:
a first terminal configured to be coupled to an electric power generation source;
a second terminal configured to be coupled to a load to be powered;
a third terminal configured to be coupled to a battery;
a linear regulator coupled between the first terminal and the second terminal;
a first comparator having its input coupled to the first terminal and its output coupled to an input terminal of the linear regulator, the first comparator configured to activate the linear regulator when a voltage level of said electric power generation source is greater than a first threshold;
a first switch coupled between an output terminal of the linear regulator and the second terminal;
a controllable current source coupled between the output terminal and the third terminal and configured to be activated by a signal provided by the linear regulator when current in the linear regulator is detected;
a second switch coupled between the output terminal and the third terminal and configured to be activated by the signal when the controllable current source is deactivated to couple the battery to the output terminal; and
a second comparator having a first input coupled to the third terminal and a second input coupled to a reference and its output coupled to the first switch.

2. The power management circuit of claim 1, wherein
a first operating mode of the power management circuit is established when the linear regulator is disconnected, the load being exclusively powered by the battery;
a second operating mode of the power management circuit is established when the linear regulator is in a conductive state, with no regulation, the voltage of the second terminal being set by the battery; and
a third operating mode of the power management circuit is established when the linear regulator regulates and sets the voltage of the second terminal, the load being powered by the electric power generation source.

3. The power management circuit of claim 2, wherein the battery is recharged in the third operating mode.

4. The power management circuit of claim 1, further comprising an element for detecting the voltage level received on the first terminal.

5. The power management circuit of claim 1, further comprising a detector to detect a charge level of the battery.

6. A self-powered device, comprising:
a power generation source;
a rechargeable battery;
a first terminal coupled to the power generation source;
a second terminal coupled to a load to be powered;
a third terminal coupled to the rechargeable battery;
a linear regulator coupled between the first terminal and the second terminal;
a first comparator having its input coupled to the first terminal and its output coupled to an input terminal of the linear regulator, the first comparator configured to activate the linear regulator when a voltage level of said power generation source is greater than a first threshold;
a switch coupled between an output terminal of the linear regulator and the second terminal;
a controllable current source coupled between the output terminal and the third terminal and configured to be activated by a signal provided by the linear regulator when current in the linear regulator is detected;

a second switch coupled between the output terminal and the third terminal and configured to be activated by the signal when the controllable current source is deactivated to couple the battery to the output terminal; and a second comparator having its input coupled to the third terminal and its output coupled to the switch, the second comparator configured to activate the switch to provide additional power when a voltage level of the rechargeable battery is greater than a second threshold and a current requested by the load is greater than power provided by the power generation source.

7. The self-powered device of claim 6, wherein the power generation source is a photovoltaic panel.

8. The self-powered device of claim 6, wherein
a first operating mode of the self-powered device is established when the linear regulator is disconnected, the load being exclusively powered by the rechargeable battery;
a second operating mode of the self-powered device is established when the linear regulator is in a conductive state, with no regulation, the voltage of the second terminal being set by the rechargeable battery; and
a third operating mode of the self-powered device is established when the linear regulator regulates and sets the voltage of the second terminal, the load being powered by the power generation source.

9. The self-powered device of claim 8, wherein the rechargeable battery is recharged in the third operating mode.

10. The self-powered device of claim 6, further comprising an element for detecting a voltage level received on the first terminal.

11. The self-powered device of claim 6, further comprising a detector to detect a charge level of the rechargeable battery.

12. A power management circuit comprising:
a first terminal configured to be coupled to an electric power generation source;
a second terminal configured to be coupled to a load to be powered;
a third terminal configured to be coupled to a battery;
a linear regulator coupled between the first terminal and the second terminal;
a controllable current source coupled between the output terminal and the third terminal and configured to be activated by a signal provided by the linear regulator when current in the linear regulator is detected; and
a switch coupled between the output terminal and the third terminal and configured to be activated by the signal when the controllable current source is deactivated to couple the battery to the output terminal;
the power management circuit is in a first operating mode when the linear regulator is disconnected, the load being exclusively powered by the battery, in a second operating mode when the linear regulator is in a conductive state, with no regulation, a voltage of the second terminal being set by the battery, and in a third operating mode when the linear regulator regulates and sets the voltage of the second terminal, the load being powered by the electric power generation source.

13. The power management circuit of claim 12, further comprising:
a first comparator having its input coupled to the first terminal and its output coupled to an input terminal of the linear regulator, the first comparator configured to activate the linear regulator when a voltage level of said electric power generation source is greater than a first threshold;
a second switch coupled between an output terminal of the linear regulator and the second terminal; and
a second comparator having its input coupled to the third terminal and its output coupled to the second switch, the second comparator configured to activate the second switch to provide additional power when a voltage level of the battery is greater than a second threshold and a current requested by the load is greater than power provided by the electric power generation source.

14. The power management circuit of claim 12, wherein the battery is recharged in the third operating mode.

15. The power management circuit of claim 12, further comprising an element for detecting a voltage level received on the first terminal.

16. The power management circuit of claim 12, further comprising a detector to detect a charge level of the battery.

17. The power management circuit of claim 13, wherein the second switch is deactivated when a voltage level of the battery is below a critical threshold.

18. The power management circuit of claim 13, wherein the first threshold defined by a voltage level at which a voltage level of the electric power generation source is greater than a voltage drop through the linear regulator when activated.

19. The power management circuit of claim 13, wherein the electric power generation source is configured to recharge the battery without a power conversion.

* * * * *